United States Patent [19]

Davis

[11] 4,205,249
[45] May 27, 1980

[54] ELECTRODE STRUCTURE FOR HALOGEN LEAK DETECTOR

[75] Inventor: William D. Davis, Ballston Lake, N.Y.

[73] Assignee: General Electric Company, Schenectady, N.Y.

[21] Appl. No.: 879,091

[22] Filed: Feb. 21, 1978

[51] Int. Cl.² .............................. H01J 7/26; H01J 1/02
[52] U.S. Cl. ...................................... 313/30; 324/468; 313/211
[58] Field of Search ......................................... 313/30; 324/33 (U.S. only)

[56] References Cited

U.S. PATENT DOCUMENTS

| | | | |
|---|---|---|---|
| 3,543,069 | 11/1970 | Schmidt | 313/30 |
| 3,612,932 | 10/1971 | Wilczek et al. | 313/30 X |
| 3,979,625 | 9/1976 | Roberts | 313/230 |
| 4,068,021 | 1/1978 | Allman | 427/116 |

Primary Examiner—Robert Segal
Attorney, Agent, or Firm—Lawrence D. Cutter; James C. Davis; Marvin Snyder

[57] ABSTRACT

An electrode structure for a halogen leak detector is disclosed in which the cathode portion is provided with a hollow metal tube through which air or other cooling fluid is passed. This hollow metal tube may also serve as the cathode electrical connection and for mechanical support. Since halogen leak detector systems are typically provided with air pumps for the passage of ambient air through the detector, it is a simple matter to also pass a stream of ambient air through the hollow metal tube in the cathode in order to maintain the cathode at a lower and more controlled temperature, thereby increasing the sensitivity of the detector and prolonging its useful life.

7 Claims, 3 Drawing Figures

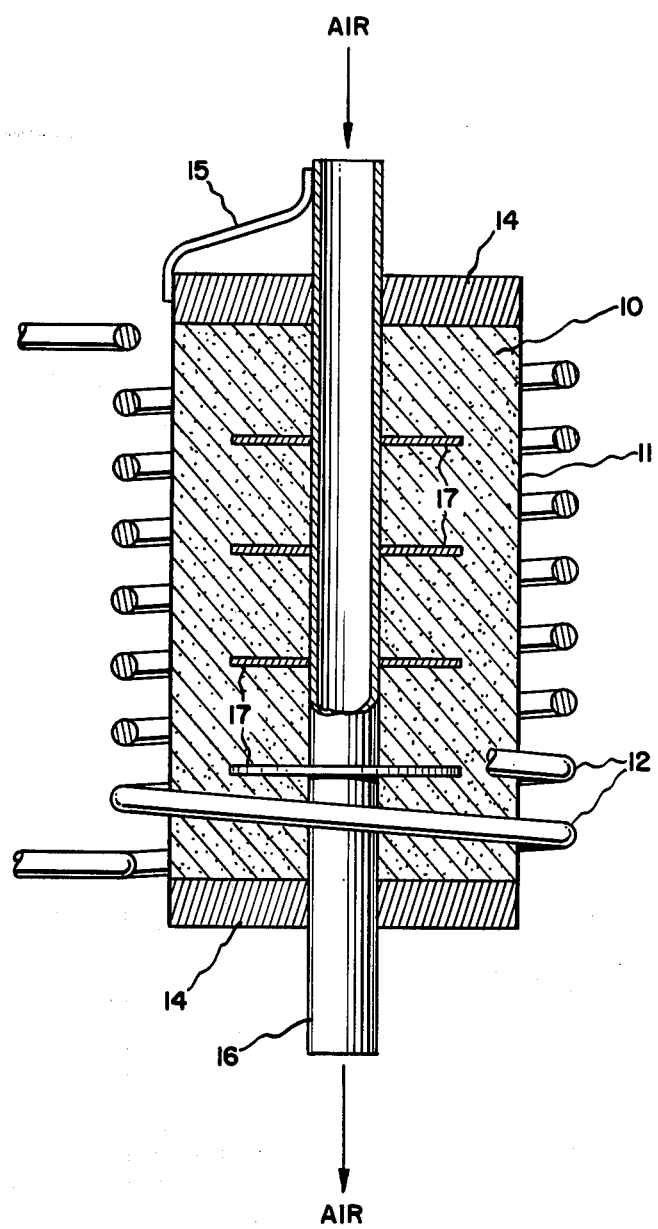

ELECTRODE STRUCTURE FOR HALOGEN LEAK DETECTOR

BACKGROUND OF THE INVENTION

This invention relates to halogen leak detectors. More particularly, this invention relates to an electrode structure for a halogen leak detector in which the cathode is provided with a hollow metal tube passing therethrough for the purpose of controlling the cathode temperature and preferably maintaining it at a temperature lower than the anode temperature.

In general, a halogen leak detector is a device which produces an increment in current in an external circuit when the detector is exposed to ambient air containing a variety of halogen compounds, such as chloroform and most refrigerants. The principal component in such halogen detecting devices is an electrode structure typically contained in a glass or metal tube through which ambient air to be tested is passed. The electrode consists of two parts, an anode and a cathode.

The anode typically consists of a helical winding of platinum, iridium or palladium wire surrounding the cathode structure. The anode is maintained at as high a temperature as possible consistent with the capability of the anode material to sustain the temperatures present. Typically, the anode is operated at a temperature of between 1,000° C. and 1,200° C. This temperature is maintained by passing an electric currrent through the helical coil. Platinum, iridium or palladium are the preferred metals to be used in the anode because of their high melting points and their oxidation-resistant capabilities. Among other factors, the sensitivity of the halogen leak detector is dependent upon the anode temperature which in turn is dependent upon the current passing through it. This sensitivity is increased for higher anode temperatures and current levels.

The cathode of the typical halogen leak detector is surrounded by the helical anode coil. The cathode comprises a foil of platinum, iridium, or palladium surrounding a substantially cylindrical portion of an alkali metal compound. The alkali metal compound is the active component of the electrode and is responsible for the production of certain alkali halides in approximately direct proportion to the concentration of halogen compounds contained in the ambient atmosphere. The alkali metal is typically either sodium, potassium or rubidium, but in fact may be any of the alkali metals. The alkali metal compound is typically an alkali silicate, carbonate or aluminate. A typical substance used in the cathode structure is alumina impregnated with sodium carbonate. The alkali metal compound is present in the cathode in the form of a loosely packed powder. The cathode also has an electrically conductive lead passing through the center of the cathode in an axial fashion, that is, it contains the axis of the substantially cylindrically shaped cathode.

During normal operation of such a halogen leak detector, ambient air suspected of containing a halogen compound is presented to the electrode structure and certain alkali halides vapors are formed which drift to the heated anode. At the anode, these alkali halide vapors are ionized and the resulting positive ions migrate back to the cathode so as to produce an incremental change in the current flowing in an external circuit. Typically, the external circuit consists of a current-sensing device in series with a d.c. bias voltage source which serves to maintain the cathode at a negative voltage with respect to the anode. Typically, the cathode is maintained at a voltage of −180 volts with respect to the anode. However, even without the presence of a halogen compound in the air, a background current of between approximately 1 and 2 microamperes is present. Thus, it is the increase in current that flows in the external circuit that indicates the presence and the concentration of halogen compounds present.

While the above described structure functions well in the detection of halogens in the air and is particularly useful for detecting refrigerant leaks, there are certain limitations in the structure described. For example, as mentioned above, it is desirable that the anode be maintained at as high a temperature as possible so that a greater portion of alkali halide vapors are produced in order to promot the sensitivity of the detector. However, this high temperature anode operation is inconsistent with a long life for the alkali metal surce compound. The high temperature of the anode has a deleterious effect on the potency of the alkali metal surce compound so that detectors employing the present electrode structure have limited life times. Also, in these prior art halogen detectors the cathode temperature is entirely dependent on the anode temperature. For this reason, the cathode temperature is often higher than necessary resulting in shortened detector life.

SUMMARY OF THE INVENTION

In accordance with one embodiment of the invention, the cathode is provided with a hollow metal tube passing through said cathode, and being connected to a supply of cooling air so as to maintain the cathode which includes the alkali metal source compound at a stable temperature below the temperature of the anode. The hollow metal tube is also typically composed of platinum, iridium or paladium. In accordance with another embodiment of the present invention, the hollow metal tube is also provided with heat-absorbing fins spaced uniformly along that portion of the tube surrounded by the alkali metal source compound. This latter embodiment provides a greater surface contact with the source and thereby serves to maintain it at a more uniform temperature.

Accordingly, it is an object of the invention to provide an electrode structure for halogen leak detectors in which the cathode portion is maintained at a relatively lower and stable temperature than the anode, thereby providing for greater sensitivity and longer detector life.

A DESCRIPTION OF THE DRAWINGS

FIG. 3 is a side elevation sectional view of the electrode structure of a halogen leak detector in accordance with one embodiment of the present invention in which heat-absorbing fins are present.

DETAILED DESCRIPTION OF THE INVENTION

Figure 1:
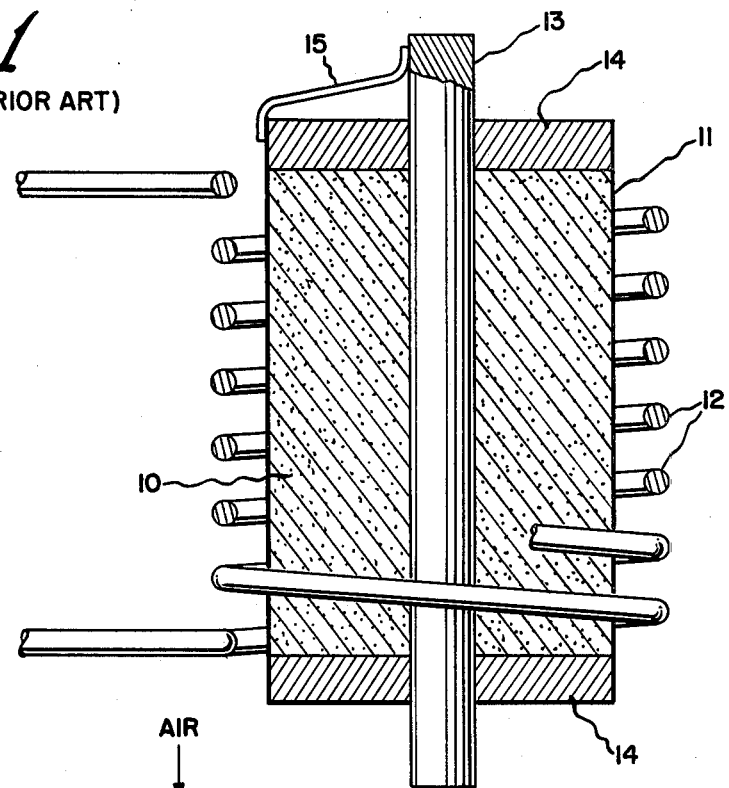
FIG. 1 is a side elevation sectional view illustrating the structure of prior art haogen leak detector electrodes.

FIG. 1 illustrates the basic halogen leak detector electrode structure as provided in prior art configurations and as described above. In this structure, there is heated anode winding 12, surrounding metal cylindrical foil structure 11 which contains the active alkali metal source compound 10, loosely packed in powdered form. Also shown are end plugs 14, typically composed of alumina which serve to contain the source within the cathode as defined by the foil envelope 11. Axially disposed through the cathode is wire lead 13, serving to electrically connect the cathode to an external circuit. Jumper wire 15 serves to connect the metal foil (typically platinum) to the lead wire 13. The lead wire 13 is typically composed of platinum or nichrome wire coated with platinum. The electrode structure described in Figure 1 is typically disposed in a heat-resistant glass, quartz or ceramic envelope through which ambient air is passed. The operation of the electrode shown in FIG. 1 is as described above. The entire electrode structure shown is typically approximately 2.5 centimeters long.

Figure 2:
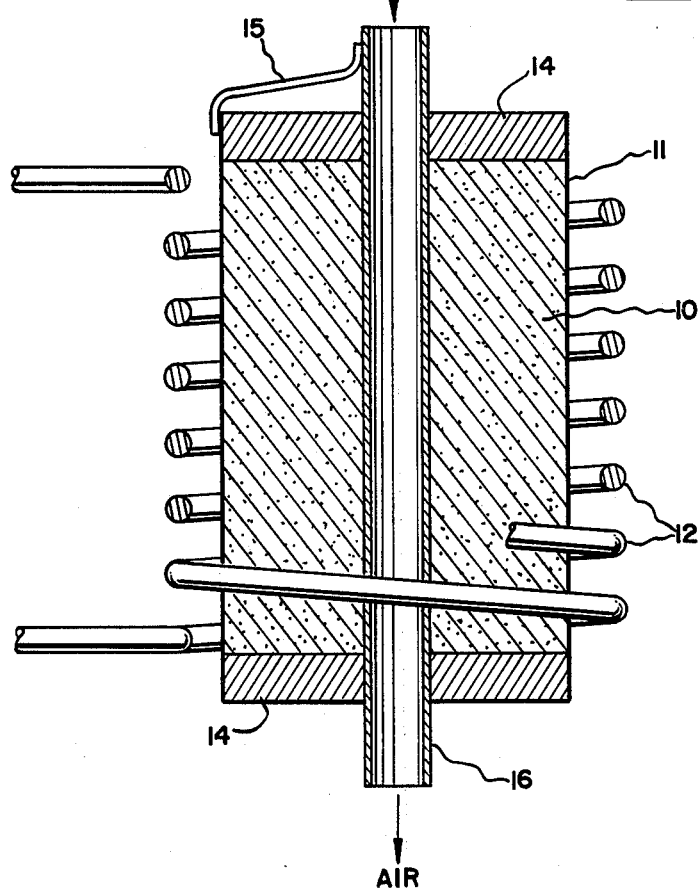
FIG. 2 is a side elevation sectional view of the electrode structure of a halogen leak detector in accordance with one embodiment of the present invention.

FIG. 2 illustrates one embodiment of the present invention. In this embodiment, electrically-conductive lead 13 is replaced with a hollow cylindrical tube 16 typically composed of platinum, iridium, or palladium, and through which cooling air or other fluid may be passed. Since the typical halogen detector system aready possesses an air pump for the delivery of ambient air to the detector, it is a simple matter to connect the air source to the hollow metal tube disposed to the cathode. The rate of flow of this air may be used to control more precisely the temperature of the cathode. The other structures of the electrode remain unchanged.

In particular, the alkali metal compound is the same as is described above, one of the chief criteria for its selection being its vapor pressure with respect to that of the resultant alkali metal halide. That is to say, the vapor pressure of the alkali metal source compound should be lower than the vapor pressure of the corresponding alkali metal halide that is produced. FIG. 3 illustrates another embodiment of the present invention in which the hollow metal tube itself is provided with fins disposed substantially uniformly along the length of the tube contained within the cathode structure itself. These heat-absorbing fins, being in greater contact with the alkali metal compound, serve not only to provide for a greater amount of heat dissipation from the cathode, but they also serve to insure that the temperature of the cathode, especially the source, is uniform.

There are several advantages to be gained by providing the halogen leak detector with the electrode structure shown in FIGS. 2 or 3. In particular, with this structure the anode may be operated at a higher temperature, thereby increasing the sensitivity of the detector without substantially affecting the life of the source material. In addition, by controlling the air flow, the temperature of the cathode may be maintained at a more constant level thereby reducing the possibility of inaccurate readings due to changes in reactivity as a result of temperature fluctuations within the cathode.

Another advantage is the increased operational life of the detector apart from any considerations of incsreased sensitivity.

As can be appreciated from the above, the electrode structure described herein provides advantages of both longer life and increased sensitivity over the structure of prior halogen leak detector electrode configurations.

While this invention has been described with reference to particular embodiments and examples, other modifications and variations will occur to those skilled in the art in view of the above teachings. Accordingly, it should be understood that, within the scope of the appended claims, the invention may be practiced otherwise than is specifically described.

The invention claimed is:

1. An electrode structure for a halogen leak detector comprising:
   a heated anode filament composed of an oxidation-resistant metal with a melting point above approximately 1,000° C.;
   a substantially cylindrical cathode envelope composed of an oxidation-resistant metal with a melting point above approximately 1,000° C., said cathode being disposed within said anode filament;
   an alkali metal source compound contained within said cathode envelope; and
   a hollow electrically-conductive lead disposed through the center of said cylindrical cathode envelope and being electrically connected thereto, whereby ambient air may be passed through said hollow lead to controllably cool said cathode and said alkali metal source compound contained therein.

2. The electrode structure of claim 1 further comprising:
   a plurality of heat-absorbing fins disposed along said hollow lead along its length within said cathode envelope, whereby the alkali metal compound is uniformly cooled.

3. The electrode structure of claim 1 in which the anode is selected to withstand temperatures between approximately 1,000° C. and approximately 1,200° C.

4. The electrode structure of claim 1 in which the anode is composed of a material selected from the group consisting of platinum, iridium and palladium.

5. The electrode structure of claim 1 in which the cathode envelope is composed of a material selected from the group consisting of platinum, iridium and palladium.

6. The electrode structure of claim 1 in which the alkali metal source compound is a material selected from the group consisting of the alkali metal carbonates, the alkali metal silicates and the alkali metal aluminates.

7. The electrode structure of claim 1 in which the hollow electrically-conductive lead is composed of materials selected from the group consisting of platinum, iridium and palladium.

* * * * *